United States Patent Office 3,691,002
Patented Sept. 12, 1972

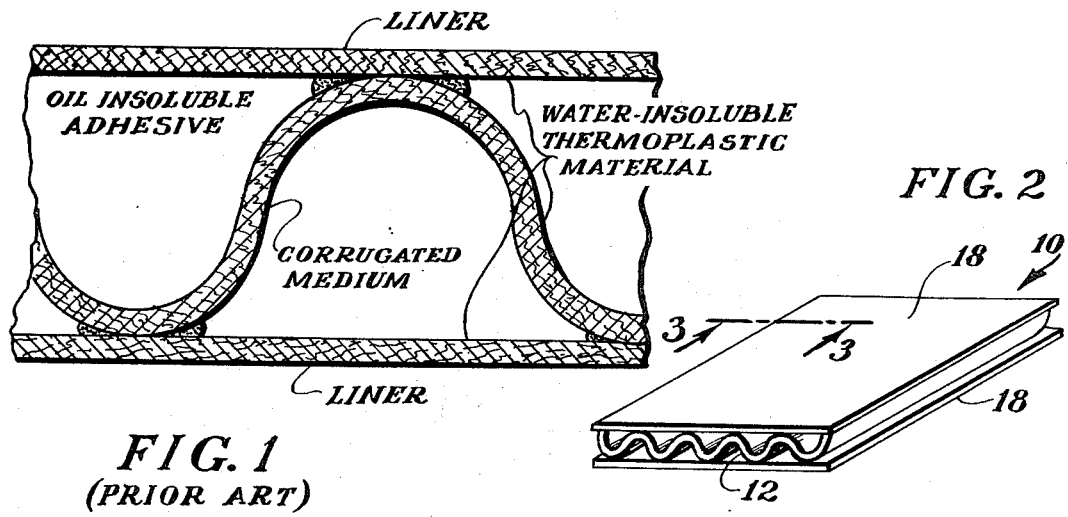
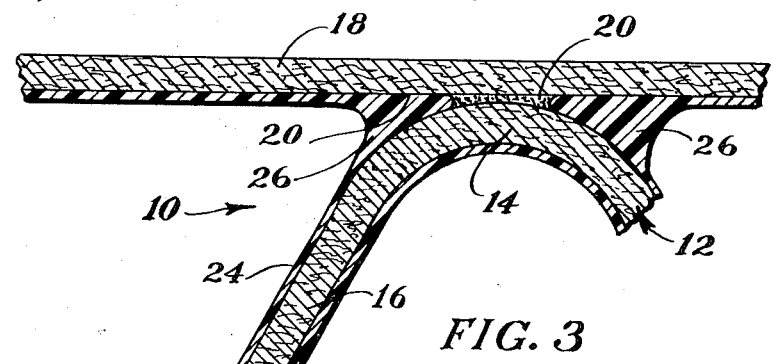
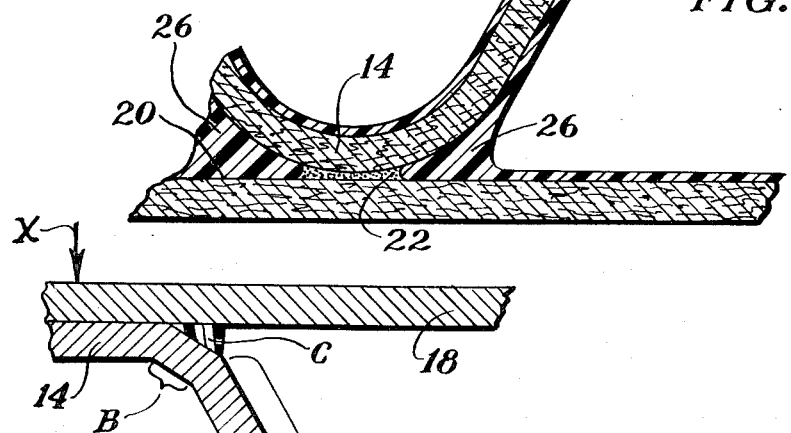
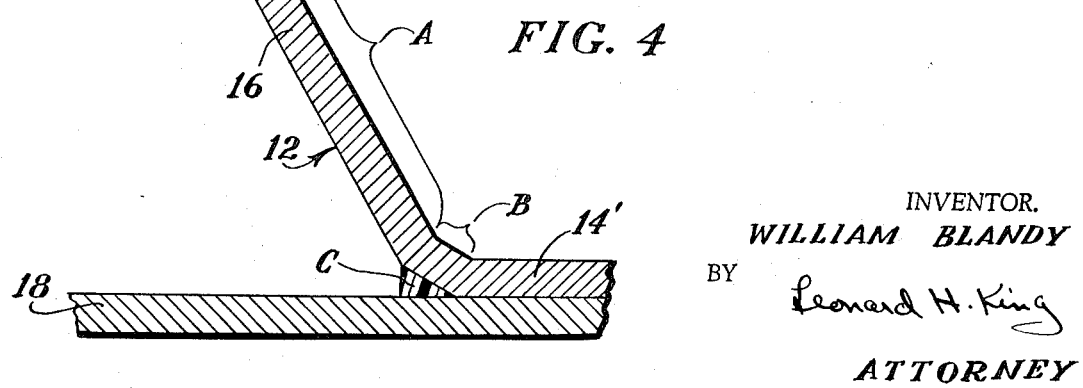

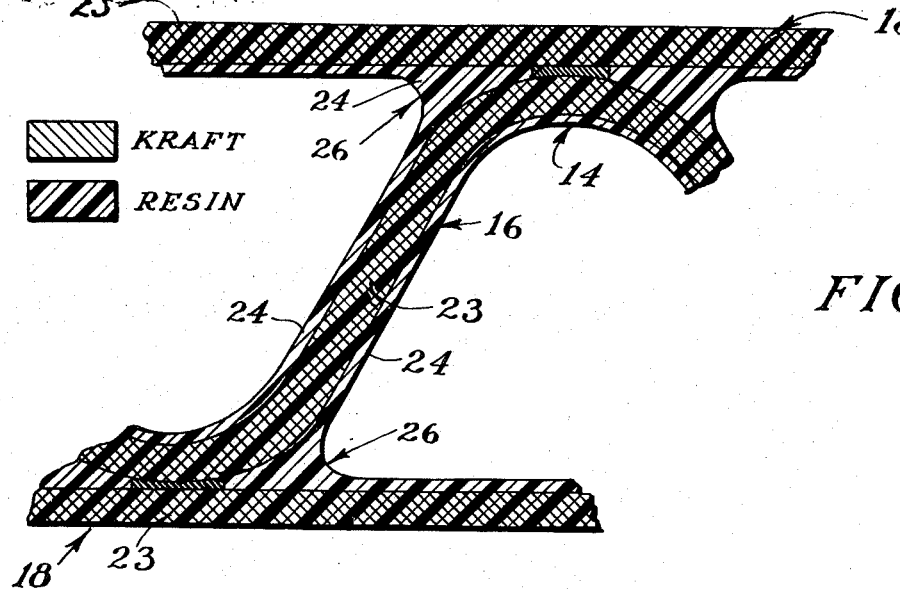
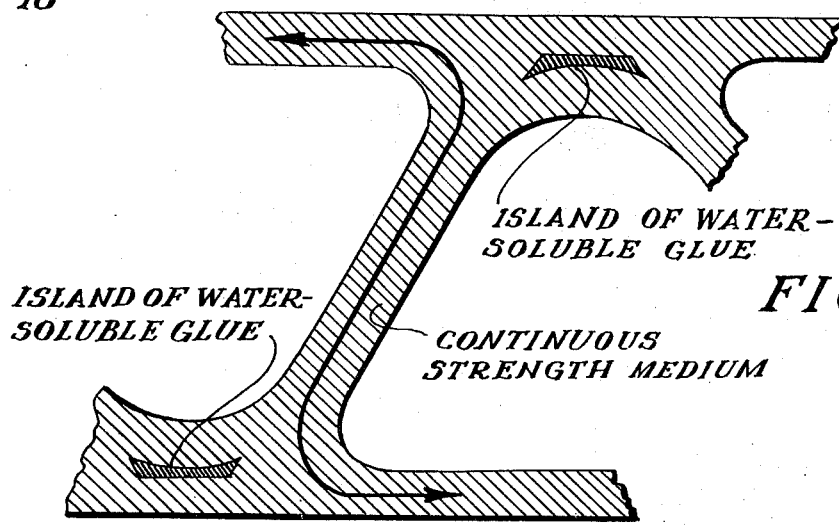
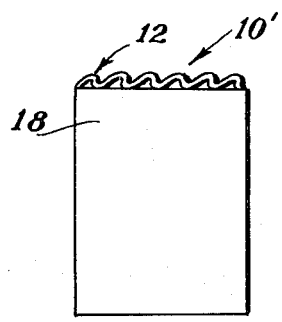 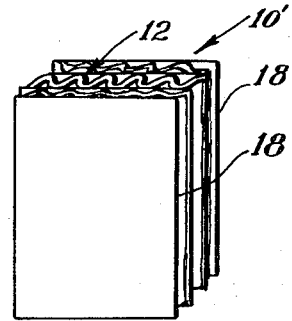 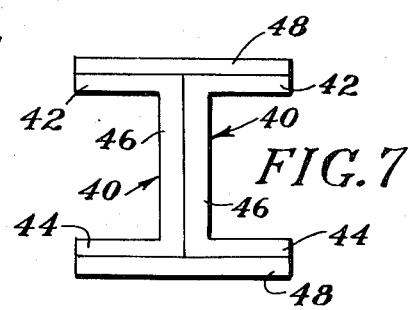

3,691,002
IMPREGNATED CORRUGATED BOARD
William Blandy, 22 Ozark St., Lake
Ronkonkoma, N.Y. 11779
Filed Oct. 23, 1970, Ser. No. 83,558
Int. Cl. B32b 3/28
U.S. Cl. 161—137                                    7 Claims

ABSTRACT OF THE DISCLOSURE

A sheet of paper board comprised of spacedly opposed facing sheets and a corrugated member intermediate the facing sheets is saturated with a resin which coats the corrugated member and also fills the corners at the bonded junctures of the facing sheets and the corrugated member. The method of this invention comprises the steps of forcing resin into the interior flutes of the formed paper board sheet and then rotating the sheet slowly about the longitudinal axis of the corrugations.

The aforementioned abstract is neither intended to define the invention of the application which, of course, is measured by the claims, nor it is intended to be limiting as to the scope of the invention in any way.

This invention relates generally to corrugated board and more particularly to an improved, resin-saturated corrugated board as well as an improved method for making the board.

BACKGROUND OF THE INVENTION

As used with reference to the present invention the term "corrugated board" describes an article comprised of a sheet of fibrous, corrugated material called the medium that is interposed between and adhesively secured at points of contact to a pair of substantially flat, fibrous facing sheets or liners. The teachings of the present invention are applicable to "single-face" corrugated board wherein only one liner is secured to the medium. Similarly, the concept of the present invention may be applied to "multiple-wall" corrugated board that is comprised of multiple mediums and multiple liners.

In the past, several different proposals have been made for rigidizing and moisture-proofing corrugated board. It has been recognized by those working in the field that improvements are required, particularly for reinforcing the adhesive joints. U.S. Patents Nos. 3,033,708 and 3,308,006 issued on May 8, 1962 and Mar. 7, 1967 to Robert C. McKee and Herman J. Kresse et al. respectively, are examples of the proposed solutions to the problems of the industry. Generally speaking, the contribution of the prior art resides in the provision of a water-insoluble thermoplastic coating over the exposed fibrous surface and the use of an oil-insoluble adhesive adjacent the points of contact between the medium and the liner. While McKee proposes heating a coating of thermoplastic wax until it liquifies and migrates into the corrugated board, Kresse et al. suggests the use of a wax-copolymer blend to avoid having the board fibers act as wicks that convey moisture. The Kresse et al. compound also tends to overcome the inherent brittleness of the wax coatings used prior to his invention.

The product and method of the present invention provides substantial improvement over the available prior art. A corrugated board treated in the manner to be described in detail hereinafter exhibits a compressive strength of approximately 3000 p.s.i. as compared to the 30 p.s.i. of the same, untreated board. The generous fillets or arches provided by the present invention at the junctures of the medium and the liners substantially strengthens the otherwise inherently weak "bend zone" found in all corrugated structures. A controlled deposit of resin on the struts or straight sections of the corrugation tend to thicken and strengthen them and thereby provide a continuous monolithic medium of resin from one liner to the other.

As is well known, the corrugated medium is generally of parabolic configuration when viewed in transverse cross section and is adhesively secured to the liners at tangent contact points. Bending will first occur in the relatively small zones on either side of the glue bond with the remaining sections or intermediate struts representing zones of compression. Since the compression zones have greater strength than the bending zones, a breakdown will occur first in the bending zone.

Accordingly, by filling the acute angles on each side of the glue bond with a rigid material, as taught by the present invention, these normally weak areas will not yield as readily as heretofore. The struts in accordance with this invention can be strengthened by making them stiff with a saturant and thicker with a controlled excess of saturant. The method and product of this invention change the relatively weak parabolic curve of an untreated medium to relatively strong diagonal struts. The present invention also adds moisture-proof, auxiliary bonds on both sides of the normally-weak, water-soluble glue bond used in the past.

In its broadest aspect, the method of the present invention comprises the steps of injecting a measured quantity of liquid resin into each internal cavity or flute of the corrugated board so that all interior surfaces are uniformly covered and each flute contains substantially the same quantity of resin and then slowly rotating the board about the longitudinal axis of the corrugations. The article resulting from the aforementioned method is, in its broadest aspect, characterized by resin coated and stiffened struts and by resin fillets in the bending zones adjacent the glue bonds.

Accordingly, it is a primary object of this invention to provide an improved method for treating and strengthening corrugated board.

It is an important object of this invention to provide an improved and stronger corrugated board and product made therefrom.

A further object of this invention is to provide an improved corrugated board structure that has greater load-bearing characteristics than the prior art, parabolic form corrugations.

A specific object of the invention is to provide improved structural members of treated corrugated board.

Still another object of this invention is to provide a controllable method for strengthening corrugated board.

An additional object of this invention is to provide an improved method for controlling the quantity and deposition of the resinous material used for strengthening corrugated paper board.

A feature of this invention is that the treated corrugated board is strong, lightweight and relatively inexpensive to manufacture.

An advantage of this invention is that the treated finished product is resistant to moisture, sunlight, fire, rodents, warp, termites and rot and in addition has good insulating properties.

Another feature of this invention is that the treated finished product can be printed, decorated and colored and can be made either substantially translucent or opaque. Alternatively, pre-printed corrugated board can be treated by the method of this invention to achieve the objectives referred to above.

Still another advantage of this invention is that the treated finished product can be die-cut, formed and factory assembled in various shapes and structures.

These and other objects, features and advantages of the invention will, in part, be pointed out with particularity and will, in part, become obvious from the following, more detailed description of the invention, taken in conjunction with the accompanying drawing which forms an integral part thereof.

In the various figures of the drawing, like reference characters designate like parts.

BRIEF DESCRIPTION OF THE DRAWINGS

FIG. 1 is a cross sectional view, in elevation, illustrating the configuration of typical prior art structure;

FIG. 2 is a perspective and somewhat schematic view illustrating a section of corrugated board treated in accordance with the method of this invention;

FIG. 3 is a greatly enlarged sectional view taken along line 3—3 of FIG. 2;

FIG. 4 is a greatly enlarged sectional view schematically illustrating a portion of a corrugated medium treated in accordance with the method of this invention;

FIGS. 5A and 5B, schematically illustrate the improved product of this invention in cross-section;

FIGS. 6A and 6B schematically illustrate two alternative embodiments of the structure comprising this invention; and FIGS. 7, 8, 9, 10 and 11 illustrate typical, composite structural members that may be formed utilizing the process of this invention.

Figure 8:
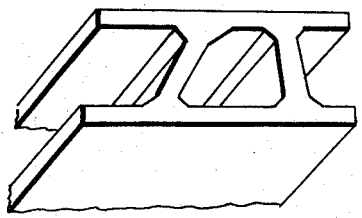

The distinctive characteristics of the present invention will be most fully appreciated by first referring to the prior art illustrated in FIG. 1. The inherent weakness of this structure is at the contact points between the corrugated medium and the liner. Neither the oil-insoluble adhesive nor the thermoplastic resin provides an uninterrupted, moisture resistant, strengthening medium from one liner to the other.

By way of contrast, the method of this invention provides an improved corrugated board 10 illustrated in FIGS. 2, 3 and 4. A fibrous corrugated medium 12 having a plurality of crests 14 and angularly oriented struts 16 is bonded to and between a pair of fibrous liners 18 having spacedly opposed confronting surfaces 20. Glue bonds 22 (typically water-soluble in the corrugated industry) are applied at the tangential contact areas between the crests 14 and the surfaces 20. In a manner to be described hereinafter, a synthetic resin 23 saturates the liner 18 and the corrugated medium 16 and deposits a layer 24 on all interior surface areas. Of particular importance are the resin fillets 26 formed outboard of each of the glue bonds 22.

The resin saturant 23 and the resin layer 24 are low-shrinkage thermosetting resin such as epoxy, polyester or other cross-linking resins such as acrylics, nylons, urethanes, etc. The resin layer 24, when applied to a 0.008 inch thick strut 16 increases the total thickness to approximately 0.011 inch thick and the ability to withstand crush from 30 p.s.i. to approximately 3000 p.s.i.

Referring now to FIG. 4, in particular it will be seen that, for purposes of this description, the parabolic type configuration of the corrugated medium 12 has been changed to successive straight sections. Strut 16, designated as A, is a zone of compression and crest 14, designed as B, is a zone of bending. Zone A has a compressive strength which is greater than the bending strength of Zone B. Therefore, with a compressive force acting in the direction of arrow X, Zone B will normally yield first. However, by filling area C with a rigid, resinous material, as proposed herein, Zone B becomes thicker and stronger than Zone A and will not bend. It should be noted at this time that Zone A (strut 16) can be strengthened by curing a resinous saturant therein. Zone A can also be thickened by applying a controlled excess of the resinous saturant.

FIGS. 5A and 5B schematically illustrate the saturation of the medium and the liners with liquid resin. It will be observed that the strength of the medium is continuous and extends through the liner or liners. It will be further noted that the medium is secured to the liners by islands of water-soluble glue that are surrounded by resin deposits which help to secure the liner to the medium.

The process for making the treated corrugated board of this invention comprises the steps of forcing a measured amount of liquid, thermosetting resin into each internal cavity or flute of each piece of corrugated board that is held in a tightly compressed bundle or sheaf, of boards and of rotating the sheaf about the axis of the corrugations. The axes of the corrugations are maintained horizontal during rotation of the bundle in order to distribute the liquid uniformly over the length of the cavities and around the inner periphery of the cavities. This action assures uniform distribution of the resin until the liquid reaches the gel stage and ceases to flow. The improved process of this invention results in a continuous, monolithic medium of rigid resin throughout the corrugated board and further creates a novel structure of struts buttressed by curved fillets which provides maximum strength with a minimum use of material. The fillets are formed due to the capillary attraction of the crotches at the junctions of the liner or liners and the corrugated medium, by the flow discontinuity or turbulence at the crotches and by the cohesive force of the liquid which is greater where the deposit is greater to start with. The same excess of fluid which forms the fillets also coats the liner or liners and the inner surfaces of the medium but with a build-up which is much thinner than the fillets. This inner coating adds moisture resistance as well as strength, by providing a continuous coating to hide the wick ends of the paper fibers.

The process of this invention provides for free flow of liquid resin inside the flutes to achieve equal horizontal distribution before the resin gels but prevents flow through the liners in order to control the internal deposits and the resulting strength. This control may be achieved by reducing the porosity of the liner or by compression of the boards throughout the liner face (in cases where the liners are sufficiently flat on the outside to make 100% contact).

If a low-porosity liner is not provided to start with, it may be made non-porous by external coating or by an initial saturation wherein a bundle of boards is brought in contact with an amount of thermosetting liquid which is sufficient to saturate the boards but not sufficient to provide any excess to form a coating. The same steps that are used to form the fillets may be used for the initial saturation, except that rotation of the bundle of boards is not required; just injection of resin and inversion of the boards, as will be explained subsequently. After the saturant has either gelled or hardened, the injection and internal coating process can be performed. In order to charge each flute with an identical quantity of liquid resin, the sheaf of boards to be treated is forced into a horizontal bath of liquid while the container walls squeeze the boards to prevent flow between adjacent boards. As the open ends of the flutes move toward the horizontal bottom of the container, it is impossible for the liquid to rise higher in one flute than in another, due to the levelling influence of gravity.

The treatment begins by loading a sheaf of squarely-cut boards of identical length into a dry, snug-fitting, rigid four-sided open fronted container which extends about ¾ to ⅚ of the length of boards, measured along the flutes. A rigid cover is then clamped over the open front of the container, thus compressing all boards tightly and allowing the remaining fraction of the boards' length to project with open flutes at the exposed ends. This tight container is then used as a ram or holder to force the sheaf of boards into an equally tight-fitting but shallow container which is partly-filled with catalyzed liquid resin that is thinned with a reactive diluent, as necessary to reduce the viscosity. As the open ends of the flutes enter the bath, the liquid flows only into the flutes because there is no space between adjacent boards or between the container and the boards. When the boards touch bottom, all flutes hold resin columns of equal height. The liquid immediately starts to soak into the liners and medium (unless it is a pre-saturated board).

The composite container is then inverted and suitable vents are opened so that the liquid runs to the other end of the flutes. When the liquid reaches the other end, the container is again inverted to get the liquid back to the middle. The vents are closed and then the container is placed in a perfectly level position. The container is then rotated about the axes of the corrugations until gel takes place. The cover may then be removed from the container and the boards removed.

While the product or article of this invention, as well as the method, have been described in conjunction with two spacedly opposed liners, it should be clearly understood that the scope of the invention is not limited thereto. As mentioned earlier, and shown in FIG. 6A, a "single-face" corrugated board 10' with only a single liner may also be fabricated. Similarly, a "multiple-wall" corrugated board 10' may also be fabricated by adding additional corrugated mediums and face liners as schematically illustrated in FIG. 6B. The resultant structure can be flat or curved or cylindrical.

FIG. 7 is intended to be typical of the many structural elements and products that may utilize the articles described above. The present invention has many applications and is not limited to the illustrated member. Before the resin is cured the corrugated board 40 is bent, for example, along appropriately placed score lines to define legs 42 and 44 as well as web 46 therebetween. Two of the boards 40 and facing sheets 48 are then adhesively secured together in the relationship shown. It will be evident that other structural shapes, such as an I, a T, an H, a Z, etc., may be formed in the same manner. Similarly tubular members, either circular or non-circular in transverse cross-section may also be made utilizing the method of this invention.

Figure 9:
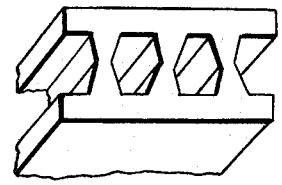
Figure 10:
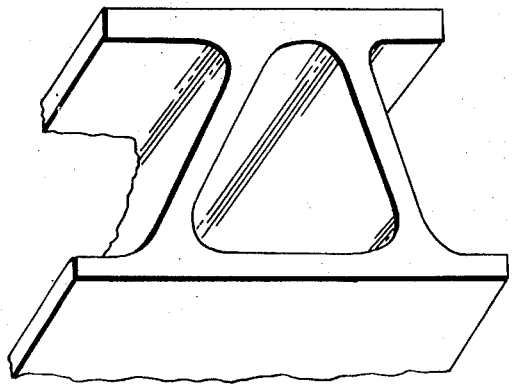
Figure 11:
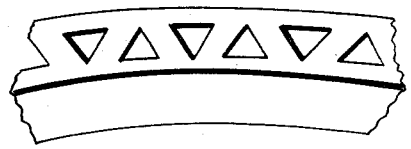

FIGS. 8–11 illustrate still other structural shapes that are available by the use of the improved process described hereinabove. Common to all of the shapes are liners that are in substantially parallel planes and a plurality of angularly oriented planar struts that are equivalent to the medium. The junctures of the medium and the liners are thickened, as described above, and may in fact be the thickest areas of the structure.

By way of example, and without intending to be limiting, some applications of the product of this invention include walls, floors, ceilings, storage pallets, shipping containers, boats, toys, cess-pools, furniture, metal laminates, etc. The variety of usage is extensive because articles made by the method described above have a unique combination of desirable features. The articles are also non-porous, non-splinterable, shock resistant and can be stencilled, colored, flocked or otherwise decorated. The products of this invention are more resilient than concrete, require no top coat, do not rust and can be inexpensively made in large sheets that can be installed easily wherever required.

There has been disclosed hereinabove the best embodiment of the invention presently contemplated. However, it is to be understood that various changes and modifications may be made by those skilled in the art without departing from the spirit of the invention.

What I claim as new and desire to secure by Letters Patent is:

1. An improved corrugated board comprising the combination of:
   (a) at least one fibrous liner;
   (b) a fibrous, corrugated medium having a plurality of crests adhesively secured to said liner;
   (c) a layer of resin covering all surfaces of said corrugated medium and at least the surface of said liner to which said corrugated medium is secured; and
   (d) a resinous fillet formed at each juncture of said corrugated medium and said liner, said fillets being outboard of each juncture, said fillets extending the length of the corrugations and being integral with said layer of resin.

2. The corrugated board in accordance with claim 1 wherein said liner and said medium are saturated with a liquid resin and said resin layer is integral with said saturant.

3. The corrugated board according to claim 1 wherein said resin is an epoxy.

4. The corrugated board according to claim 1 wherein said resin is a polyester.

5. The corrugated board according to claim 1 wherein there are two spacedly opposed liners and said corrugated medium is adhesively secured thereto intermediate the confronting surfaces of said liner.

6. The corrugated board according to claim 1 wherein there are two pairs of said liners, said liners of each said pair being adjacent each other, said pairs being spacedly opposed from each other with said corrugated medium being positioned intermediate thereto and adhesively secured to the innermost liner of each of said pairs.

7. The corrugated board in accordance with claim 6 wherein said adjacent liners are secured to each other by a resinous bond.

References Cited
UNITED STATES PATENTS

| | | | |
|---|---|---|---|
| 1,199,508 | 9/1916 | Swift | 161—137 X |
| 1,997,389 | 4/1935 | Palmer | 161—137 X |
| 2,839,442 | 6/1958 | Whitaker | 161—69 X |
| 2,951,004 | 8/1960 | Martin et al. | 156—298 X |

WILLIAM A. POWELL, Primary Examiner

U.S. Cl. X.R.

117—101, 155; 156—210, 280; 161—135